United States Patent
Shemer et al.

(10) Patent No.: US 11,461,190 B2
(45) Date of Patent: Oct. 4, 2022

(54) FILESYSTEM OPERATION BOOKMARKING FOR ANY POINT IN TIME REPLICATION

(71) Applicant: EMC IP Holding Company, LLC, Hopkinton, MA (US)

(72) Inventors: Jehuda Shemer, Kfar Saba (IL); Alex Solan, Tel Aviv (IL)

(73) Assignee: EMC IP Holding Company, LLC, Hopkinton, MA (US)

(*) Notice: Subject to any disclaimer, the term of this patent is extended or adjusted under 35 U.S.C. 154(b) by 171 days.

(21) Appl. No.: 16/558,606

(22) Filed: Sep. 3, 2019

(65) Prior Publication Data
US 2021/0064482 A1 Mar. 4, 2021

(51) Int. Cl.
*G06F 16/00* (2019.01)
*G06F 11/14* (2006.01)
*G06F 16/178* (2019.01)
*G06F 16/17* (2019.01)
*G06F 16/11* (2019.01)

(52) U.S. Cl.
CPC ........ *G06F 11/1469* (2013.01); *G06F 16/128* (2019.01); *G06F 16/178* (2019.01); *G06F 16/1734* (2019.01); *G06F 2201/84* (2013.01)

(58) Field of Classification Search
CPC ............................ G06F 16/128; G06F 11/1469
USPC .................................................. 707/626, 639
See application file for complete search history.

(56) References Cited

U.S. PATENT DOCUMENTS

| 2013/0054529 | A1* | 2/2013 | Wang ............... G06F 16/128 707/639 |
| 2014/0201149 | A1* | 7/2014 | Wang ............... G06F 16/178 707/639 |
| 2018/0101466 | A1* | 4/2018 | O'Dowd ............ G06F 11/3664 707/707 |

* cited by examiner

*Primary Examiner* — Alexandria Y Bromell
(74) *Attorney, Agent, or Firm* — Barry N. Young

(57) ABSTRACT

An agent executing on a processor at a data production site detects filesystem events and creates a list of bookmarks describing the filesystem events in user-understandable strings. Each bookmark is associated with metadata about the filesystem event that includes a timestamp and a point-in-time (PiT) snapshot of the filesystem at the time of occurrence of the event. The bookmarks and associated metadata are transferred to a recovery site and the bookmark set is recorded in storage. The storage can be searched for bookmarks in the set that reference the filename of a file of interest, and the file recovered and replicated using an associated PiT.

16 Claims, 3 Drawing Sheets

Bookmark List

| Timestamp | Size | Consistency | Bookmark |
|---|---|---|---|
| 19/03/2019 06:45:02.153 | 2k | Crash-Consistent | |
| 19/03/2019 06:45:02.154 | 3k | Crash-Consistent | /dir1/file1.txt open |
| 19/03/2019 06:45:02.158 | 2k | Crash-Consistent | |
| 19/03/2019 06:45:02.170 | 2k | Crash-Consistent | |
| 19/03/2019 06:45:02.250 | 8k | Crash-Consistent | /dir1/file2 deleted |
| 19/03/2019 06:45:02.252 | 24k | Crash-Consistent | /dir1/file1.txt close |
| 19/03/2019 06:45:02.450 | 1k | Crash-Consistent | |
| 19/03/2019 06:45:03.020 | 1k | Crash-Consistent | |
| 19/03/2019 06:45:03.033 | 4k | Crash-Consistent | /dir4 create dir |
| 19/03/2019 06:45:03.121 | 2k | Crash-Consistent | |

Figure 3

FILESYSTEM OPERATION BOOKMARKING FOR ANY POINT IN TIME REPLICATION

BACKGROUND

Computer data storage systems typically have a need to protect stored data to permit recovery of the data in the event of a disaster, and may employ various data protection approaches for this purpose. One such approach is data backup, where backup copies (discrete static images) of a data storage volume are saved periodically, e.g., weekly, daily, or hourly to enable recovery of backed up data following a crash. While traditional data backup may permit the data to be recovered to a particular point in time at which a backup copy was made, a disadvantage of traditional backup is that it does not permit recovery of any intermediate changes to the data that were made between the backup copy and the crash or for that matter between backup copies, and does not enable replication of the system. In some enterprise storage systems such as transactional processing, banking or military applications any loss of data can be disastrous.

Continuous data protection (CDP), also known as continuous backup, is an approach that backs up computer data by automatically saving a copy of every change made to that data at a block level. This typically requires asynchronously copying data changes to a second location, which imposes additional resource requirements and overhead for additional disk write operations, but it avoids the need for scheduled backups. CDP systems create numerous point-in-time images ("PiTs") and information about data changes, so theoretically CDP allows restoration of data to any incremental point in time at which data changes occurred. However, both traditional backup and continuous backup systems operate at the block level; and neither is designed to provide a list of specific data changes that facilitate point-in-time recovery and replication of lost or corrupted data of interest.

Dell EMC RecoverPoint technology is a journal-based product offering of the assignee of this invention that provides continuous data protection for storage arrays running on a dedicated RecoverPoint Appliance (RPA). The RecoverPoint technology enables protection of data at local and remote locations, and it provides bi-directional replication and any point-in-time recovery of data. RecoverPoint facilitates restoration of the system, not just particular data.

A disadvantage to a user of any point-in-time replication systems is that they create a large number of PiTs, and users do not have convenient visibility into the contents of these PiTs because of the lack of an index to identify an appropriate PiT that contains data of interest. In order to search a PiT to determine if it contains a particular data change or state of interest, the PiT must be mounted to view it to determine whether it contains the change or state of interest, which is very time consuming. This makes it difficult to easily locate a particular PiT that includes data of interest. Traditional filesystem indexing of PiTs is impractical because it takes too long. Creating a filesystem index may take several seconds or minutes to complete, whereas a PiT may be created every few input/outputs (I/Os), and there may be hundreds or thousands of I/Os created every second. Thus, it is impractical to create an index of every filesystem change. Periodic indexing of PiTs is too granular and inaccurate to be effective and is additionally complex to implement.

There is a need to address these and other issues associated with point-in-time replication by providing systems and methods that afford effective and easy visibility into and searching of PiTs created during the operation of a CDP system to enable PiTs containing changes of interest to be quickly located to permit replication and data recovery at any point in time. The invention affords a system and method that address these and other issues associated with recover point CDP systems, and that satisfy the foregoing objectives.

BRIEF DESCRIPTION OF THE DRAWINGS

FIG. 3 is a diagrammatic view of a portion of a bookmark list in accordance with the invention.

DESCRIPTION OF PREFERRED EMBODIMENTS

Figure 1:
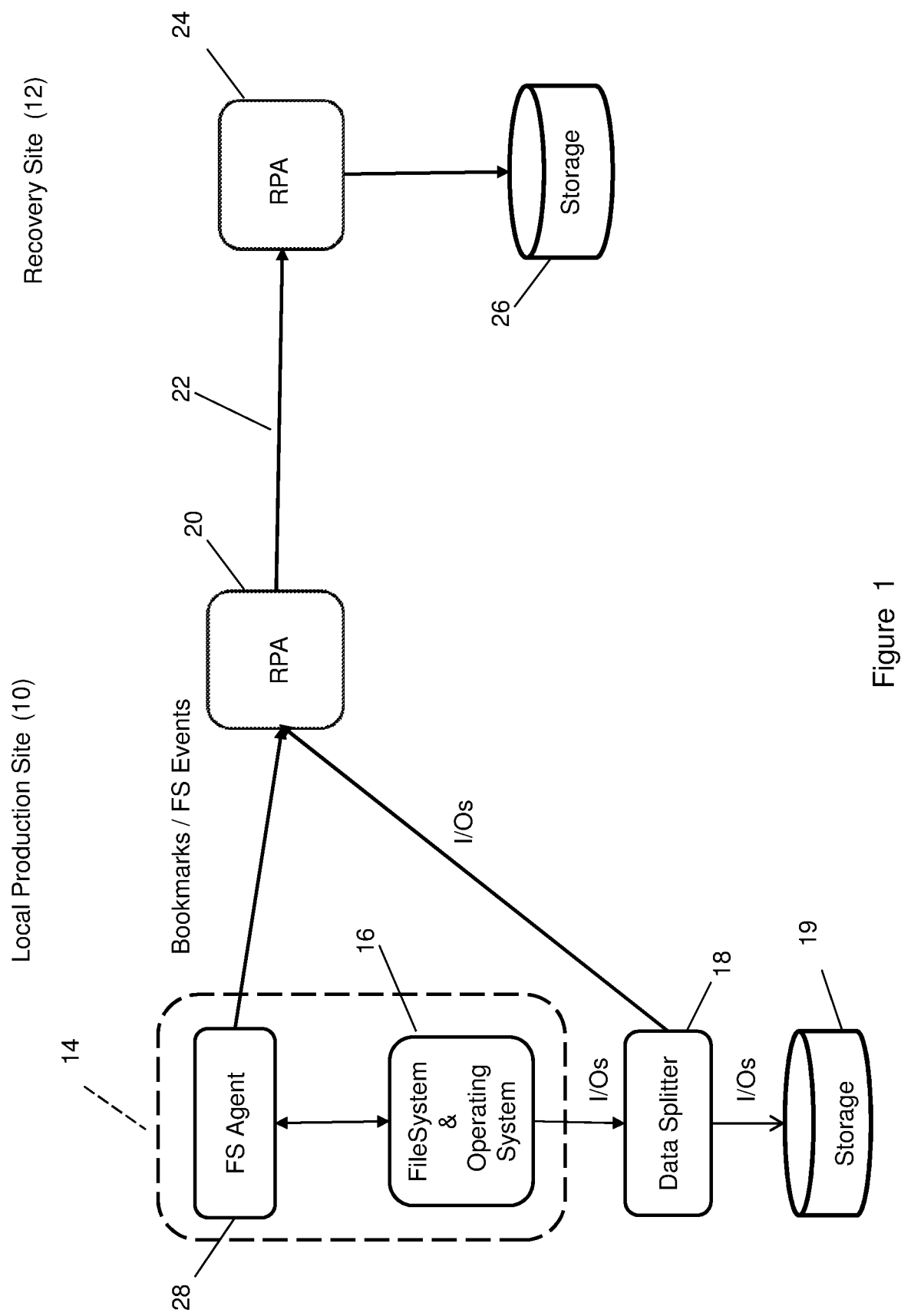
FIG. 1 is functional block diagram of an embodiment of an any point-in-time replication system in accordance with the invention.

The invention is particularly well adapted for use with RecoverPoint continuous data protection (CDP) systems of Dell EMC, the assignee of this invention, for any point-in-time recovery, and will be described in that context. However, it will be appreciated from the description that follows that the invention may also be used effectively with other types of replication/recovery systems.

Dell EMC RecoverPoint technology, a journal based offering of the assignee of this invention, provides continuous data protection for any point-in-time recovery. RecoverPoint CDP tracks all changes to data at the input/output (I/O) or block level, and journals these changes as a sequence of consecutive events. In contrast to backup systems, which store only static and periodic discrete changes to data, with RecoverPoint CDP every I/O event that changes data such as a data write to a file is tracked and stored as a different PiT snapshot of the data drive. This allows restoration of data to any I/O or PiT. If a data block or a data file is corrupted or lost, the journal allows rolling the data back to a previous point-in-time to view the data state of the drive as it existed previously prior to loss or corruption, and enables recovery and replication of the data locally as well as remotely at a recovery site. RecoverPoint also enables rolling forward from a selected PiT to view subsequent data changes from that selected PiT. While journaling replication systems such as RecoverPoint capture several million points in time each day, they do not afford convenient and quick visibility into the contents of PiTs, so locating a particular change or a particular data file, for example, can be challenging and time consuming.

As will be described below in detail, the invention provides a system and method which capture filesystem events at a filesystem level and translate these filesystem events into changes that happen at a block level to a point-in-time (PiT) snapshot of the data at the time of occurrence of the change, and additional metadata comprising a timestamp and a bookmark describing the filesystem event. The system and method of the invention save this filesystem level information as a stream of metadata in a journal. The bookmarks comprise descriptive text strings which describe the filesystem level changes to the system, and afford comprehensible understanding, insight and cues into associated block level (I/O) data changes. The bookmarks afford convenient visibility into and easy searching of the journal to locate a data change involving the filename of a file or other data of interest. Once located, the associated PiT and metadata may be used to recover and replicate the desired file or data.

As used herein, and as well understood by those skilled in the art, the term filesystem (FS) refers to an organization and structure that controls how pieces or groups of data are stored and retrieved. A filesystem keeps track of where data is located in a storage device. It refers to the logic and structure used to manage groups of data. Without a filesystem, information placed in a storage medium would be one large body of data with no way to tell where one piece of information ends and the next begins. The term "file" refers to a group or piece of data, i.e., "data file", in a filesystem, and is typically accessed by a filename and a path to a directory (or folder) in the filesystem where it is located. There are differences between filesystem operations or events, and file or block level events. The term "filesystem event" as understood by those skilled in the art and used herein refers to operations at the filesystem level that change the structure and organization of a filesystem, such as, for example, the following: Create File; Remove File; Move File; Create Directory; Remove Directory; Open File for Write/Modify; and Close File. File or block level operations on the other hand are those changes that occur on a file level to a file itself, such as, for example, the following: Read File; Write File; Copy File; Delete File, Move File, etc. The term "metadata" as used herein refers to bookkeeping information about a file in a filesystem, such as, for instance, the length of the data contained in the file, e.g., the number of blocks or the byte count, a timestamp indicating the date and time the file was created or last modified, the file device type, the file's users or group ID, its access permissions, and other file attributes such as whether it is read-only, an executable, etc.

Referring to FIG. 1, the figure illustrates a functional block diagram of a system in accordance with a preferred embodiment of the invention. In an embodiment, the invention preferably comprises a modification and enhancement to a RecoverPoint system that employs continuous data change monitoring at a local production site 10 and replication and recovery at a recovery site 12. The system of FIG. 1 may comprise, for instance, the Dell EMC RecoverPoint for Virtual Machines implementation that enables concurrent local and remote data replication with continuous data protection for recovery to any point-in-time (PiT).

The standard local production site 10 may comprise a production processor 14 such as virtual machine (VM), as from VMware, for example, having an associated filesystem (FS) and operating system (OS) 16. The production site processor 14 may also have associated physical media (not shown) storing computer executable instructions for controlling the processor to perform operations as described herein. The production site processor may further have an associated I/O data splitter 18 that is adapted to split off block I/O changes being made to data in a storage device 19, and to provide the changes to a local cluster of one or more RecoverPoint Appliances (RPAs) 20.

Each RPA of the local cluster may comprise a special purpose appliance that includes a processor and associated memory storing executable instructions for controlling the processor and that manages virtual machines and virtual volumes (not shown). The RPA 20 of the local site 10 may be connected as via a fibre channel (FC) or Ethernet (EN) TCP/IP connection 22 to a remote cluster of RPAs 24 at the recovery site 12. The RPAs 20 and 24 may be substantially the same, and they may manage similar SANs. The RPAs 24 at the recovery site may also be connected to a journal 26 into which information is stored about I/O block level changes to the files at the local site 10 which are transferred by RPA 20 over network 22 to RPA 24. This information about I/O changes may comprise timestamps, PiT images, and other metadata. The journal is a source of indexing information of changes to data.

As may be appreciated, the recovery site 12 may be geographically remote from the local production site 10 or, alternatively, may be co-located with the local production site in the same data center, for instance. Moreover, the recovery site may be adapted to receive information streams from multiple production sites, and to recover and replicate files or data of interest in different locations.

The system of FIG. 1, as described so far above, is substantially the Dell EMC RecoverPoint CDP system, before enhancement in accordance with the invention. In accordance with an embodiment of the invention, a standard Dell EMC RecoverPoint system is enhanced, in one aspect, by the addition of a filesystem (FS) event splitter 28, also referred to herein as a filesystem (or FS) agent. The FS agent (splitter) may comprise executable instructions that run on the operating system (OS) of the local production VM processor 14. The FS agent is formed and adapted to automatically detect all operations on the filesystem 16 corresponding to filesystem (FS) events (such as Create File, Remove File, Move File, Create Directory, etc., as previously described) occurring at the filesystem level, and to create comprehensible bookmarks that describe the FS events in user understandable terms. A bookmark is an existing mechanism in RecoverPoint to mark a given PiT. Bookmarks may be associated with a timestamp, and a PiT snapshot of the event. The invention associates bookmarks and metadata with an FS event to form FS event information that characterizes the FS event. This FS event information may be forwarded to RPA 20, where it may be combined with a journal stream of I/Os and associated metadata from the file level data splitter 18, and transferred as a list of bookmarks to the RPA 24 at the recovery site 12 for recording in the storage 26. As will be described below, the FS events and bookmarks afford enhanced visibility into the information stored in the journal and the associated PiT snapshots to facilitate identifying relevant PiTs for recovery of files or data states of interest.

Figure 2:
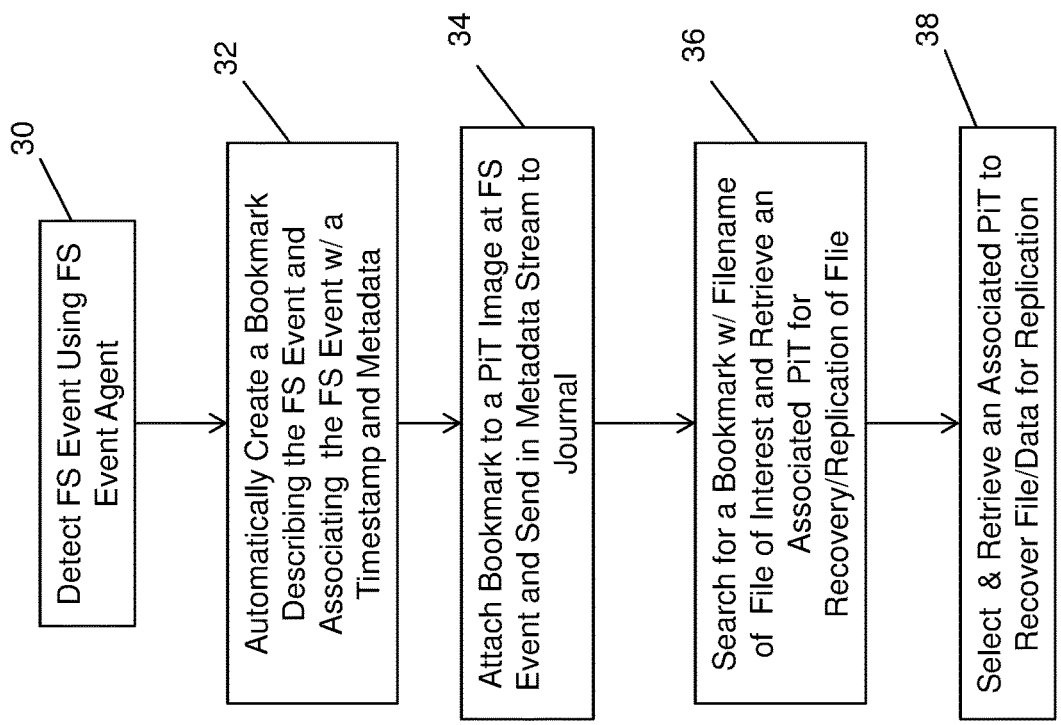
FIG. 2 is functional block diagram of an embodiment of a work flow process in accordance with the invention.

FIG. 2 illustrates a process workflow of both protection and recovery. Protection exists already in RecoverPoint. FIG. 2 also shows user-initiated recovery operations in accordance with an embodiment of the invention for identifying and retrieving relevant data for replication. The operations shown in FIG. 2 may be performed by the processors at the production site and those in the RPAs 20 and 24.

Referring to FIG. 2, at 30 the FS agent 28 may detect a filesystem event occurring in the production processor 14. At 32, the FS agent may automatically create a bookmark comprising a comprehensible description of the FS event in understandable terms, and combine the bookmark with metadata about the FS event, and a timestamp of the date and time at which the FS event occurred, and associate this information of a PiT snapshot of the filesystem at the time of occurrence of the FS event. The FS agent may send the bookmark and FS event metadata to the local RPA 20. At 34, the RPA 20 may also receive information describing a file level I/O event, along with associated metadata and a PiT snapshot from data splitter 18. At 34, the bookmark, timestamp and FS event information from the FS agent 28 may be combined with the metadata describing the I/O event from data splitter 18 and the associated PiT, and transferred as a metadata stream via network 22 to RPA 24 at the recovery site for storage in journal 26. This process may be repeated for each subsequent FS event to provide a consecutive stream of metadata for FS events for storage in the journal, as indicated and as will be described in connection with FIG. 3.

Continuing with FIG. 2, when it is subsequently desired to recover or to replicate a file of interest, at 36 the bookmarks may be searched for a bookmark with a filename of the file or other data of interest to identify and retrieve an appropriate PiT that contains an image of the file or data of interest. Searching for a bookmark is a standard operation for a PiT replication system. At 38, an appropriate PiT may be selected and retrieved to recover and replicate the file or data of interest.

FIG. 3 illustrates an embodiment of a portion of a metadata journal listing in accordance with the invention. As shown, the metadata listing may comprise a data structure comprising (diagrammatically) a table of columns comprising categories that include timestamp information that indicates the date and time of occurrence of an associated event, the data size of the file or data involved, consistency information about the file or data, and a bookmark describing the associated filesystem event. The journal may be searched to locate a bookmark describing a FS event that contains the filename of a file of interest, and to select an associated PiT to restore the file. As shown, the journal data structure may have a row corresponding to each filesystem event and each I/O file event with the events time-ordered in accordance with their sequence of occurrence, and with relevant information for each journal category of the event inserted on the row in the appropriate column. For example, in the second row at 40 the journal indicates an FS event that occurred at timestamp "19/03/2019 06:45:02.154", having a change size of "3k" bytes, and that is "crash consistent" (meaning that the image is a partial image which is less than the complete file and that the partial file may be recovered). The bookmark describes the FS event as "/dir1/file1.txt open", meaning that at the time indicated by the timestamp the file having filename file1.txt located in dir1 was opened. The journal also shows in the sixth row at 44 that the same "file1.txt" was closed at 19/03/2019 06:45:02:252. Accordingly, it would be reasonable to select a PiT after the time indicated in row 44 as a good point to restore file1.txt. Similarly, as shown at the time of the FS event on row 42, file2 in dir1 was deleted. Thus, it would be reasonable to select a PiT at a time before that time of deletion of file2 as indicated in row 42 as appropriate to restore file2.

Sending OS or FS level event information to the journal in accordance with the invention enables the journal to be quickly and easily searched to identify and select an appropriate PiT for recovering and replicating a lost or corrupted file or a data state at a particular time. Selecting a PiT just before a file was deleted or modified, or just after the file was closed, is a good time to restore the file. Similarly, a PiT before a directory was created, removed or renamed may be selected as appropriate to restore and replicate data or a previous data state of the directory. For instance, the system and method of the invention makes it possible to replicate and restore a prior data state of a filesystem easily at a desired time.

As will be appreciated from the foregoing, by providing a FS event splitter to detect FS events and creating a sequence of bookmarks and metadata that describe the events, the invention affords insight and visibility into the contents of PiTs that enable desired data to be quickly and easily located, retrieved and replicated, thereby greatly enhancing the usability of an any PiT continuous data protection system.

While the foregoing has been with reference to particular embodiments of the invention, it may be appreciated that these are merely representative and that changes to these embodiments may be made without departing from the principles of the invention, the scope of which is defined by the appended claims.

The invention claimed is:

1. A method of recovering and replicating a file in a continuous data protection any point-in-time replication system, comprising:

journaling in a user searchable journal a continuous sequence of point-in-time ("PiT") images of a filesystem, each PiT image capturing a data state of files in said filesystem at a corresponding point in time;

detecting upon occurrence input/output (I/O) block level operations and filesystem events that change a file in said filesystem;

creating a bookmark describing each said change to said file and identifying a changed file by filename and path, said bookmark comprising a user-searchable text string;

associating the bookmark with metadata comprising a timestamp and a point-in-time (PiT) snapshot of the filesystem at the time of occurrence of said file change; and streaming said bookmark and associated metadata to said journal.

2. The method of claim 1 further comprising searching said journal for a bookmark and a PiT snapshot associated with said bookmark that contains a file of interest.

3. The method of claim 1, wherein said detecting comprises detecting filesystem level changes using an agent executing on a processor, and said creating said bookmark comprises translating by said agent said changes to a descriptive string.

4. The method of claim 1, wherein said creating comprises creating said bookmark describing the file change.

5. The method of claim 1, wherein said detecting said block level operation comprises detecting an operation in a processor that causes a filesystem level change to said filesystem, and said creating comprises translating said operation into a description of said filesystem level change.

6. The method of claim 1 further comprising selecting from said journal a PiT snapshot for a time at which a file of interest was in a state prior to the file of interest being changed to recover said file of interest prior to said change.

7. The method of claim 2, wherein said file of interest comprises a state of said file as it existed at a previous time, and the method further comprises selecting from said journal a PiT snapshot for a time subsequent to which said file of interest was last changed.

8. The method of claim 1 further comprising entering into said journal bookmarks and metadata for filesystem events.

9. The method of claim 1 further comprising recovering and replicating a file of interest using said bookmarks and metadata to identify a relevant PiT snapshot of said filesystem.

10. Non-transitory computer readable storage medium embodying executable instructions for controlling a processor to perform a method of recovering and replicating a file in a continuous data protection any point-in-time replication system, comprising:

journaling in a user searchable journal a continuous sequence of point-in-time ("PiT") images of a filesystem, each PiT image capturing a data state of files in said filesystem at a corresponding point in time;

detecting upon occurrence input/output (I/O) block level operations and filesystem events that change a file in said filesystem;

creating a bookmark describing each said change to said file and identifying the changed file by filename and path, said bookmark comprising a user-searchable text string;

associating the bookmark with metadata comprising a timestamp and a point-in-time (PiT) snapshot of the filesystem at the time of occurrence of said file change; and streaming said bookmark and associated metadata to said journal.

11. The non-transitory computer readable storage medium of claim 10, wherein said executable instructions comprise an agent running on said processor that detects filesystem changes and creates said bookmark by translating said changes into a descriptive string describing said filesystem changes.

12. The non-transitory computer readable storage medium of claim 10, wherein said creating said bookmark comprises translating said file change into a description of said change.

13. The non-transitory computer readable storage medium of claim 10 further comprising selecting from said journal a PiT snapshot for a time at which said file of interest was in a state prior to the file being changed to recover said file of interest prior to said change.

14. The non-transitory computer readable storage medium of claim 10, wherein said file of interest comprises a state of said file as it existed at a previous time, and said creating said bookmark comprises selecting from said journal a PiT snapshot for a time to which said file of interest was last changed.

15. The non-transitory computer readable storage medium of claim 10 further comprising entering into said journal bookmarks and metadata for a stream of said filesystem events.

16. The non-transitory computer readable storage medium of claim 10 further comprising recovering and replicating a file of interest using said bookmarks and metadata to identify a relevant PiT snapshot of said filesystem containing a desired data state of said file of interest.

* * * * *